(12) United States Patent
Phillips et al.

(10) Patent No.: US 8,726,211 B2
(45) Date of Patent: May 13, 2014

(54) GENERATING AN EQUIVALENT WAVEFORM MODEL IN STATIC TIMING ANALYSIS

(71) Applicant: Cadence Design Systems, Inc., San Jose, CA (US)

(72) Inventors: Joel R. Phillips, Oakland, CA (US); Qunzeng Liu, Cupertino, CA (US); Igor Keller, Pleasanton, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/632,885

(22) Filed: Oct. 1, 2012

(65) Prior Publication Data

US 2014/0096099 A1   Apr. 3, 2014

(51) Int. Cl.
*G06F 17/50* (2006.01)

(52) U.S. Cl.
USPC ............ 716/115; 716/110; 716/111; 716/136

(58) Field of Classification Search
USPC .............. 716/100–111, 115, 136; 703/13–14; 714/724, 740–741
See application file for complete search history.

(56) References Cited

U.S. PATENT DOCUMENTS 7,272,807 B2 * 9/2007 Ding et al. .................... 716/113
7,359,843 B1 * 4/2008 Keller et al. ..................... 703/2

OTHER PUBLICATIONS

Hashimoto, Masanori, et al., "Equivalent Waveform Propagation for Static Timing Analysis", IEEE Transactions on Computer-Aided Design of Integrated Circuits and Systems vol. 23, No. 4, (Apr. 2004), 498-508.
Ling, David D, et al., "A Moment-Based Effective Characterization Waveform for Static Timing Analysis", Design Automation Conference, (Jul. 2009), 19-24.

* cited by examiner

*Primary Examiner* — Nghia Doan
(74) *Attorney, Agent, or Firm* — Holland & Knight LLP; Mark H. Whittenberger

(57) ABSTRACT

A method is provided for use during static timing analysis of an integrated circuit design to produce an equivalent waveform model, the method comprising: using an analog model of the inner component, to simulate an inner component to produce multiple analog simulation output characterization waveforms as a function of multiple input waveforms used to characterize the design cell; using the analog model of the inner component to simulate the inner component to produce an analog simulation output waveform as a function of the complex waveform; and producing the equivalent waveform model as a function of the multiple analog simulation output characterization waveforms and the analog simulation output waveform.

29 Claims, 17 Drawing Sheets

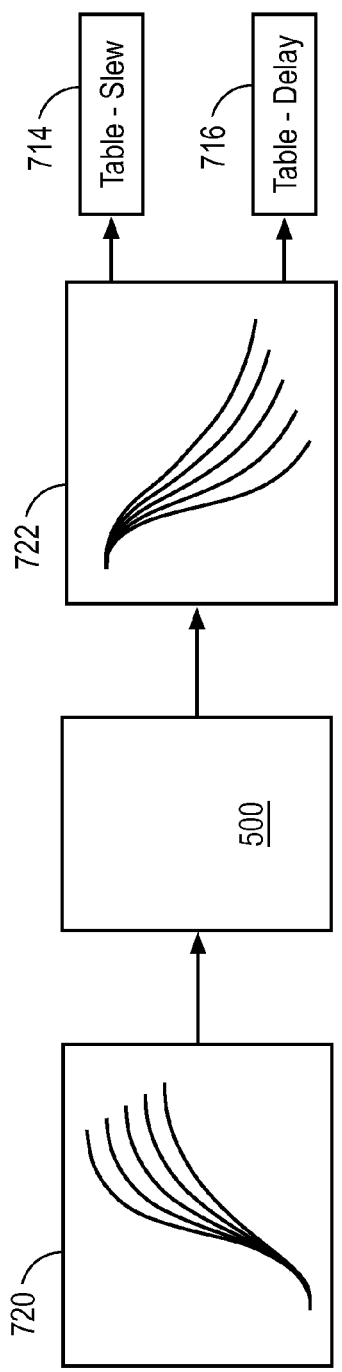
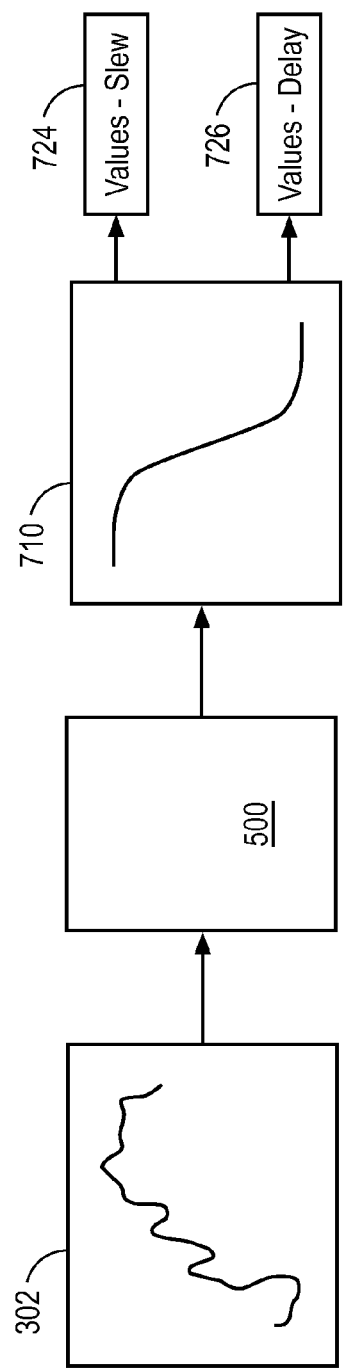
FIG. 7A
FIG. 7B

ECSM Table

| Input Slew | $C_{out}1$ | $C_{out}2$ | $C_{out}3$ |
|---|---|---|---|
| $S_{in1}$ | $V_{out}(t)$ | $V_{out}(t)$ | $V_{out}(t)$ |
| $S_{in2}$ | $V_{out}(t)$ | $V_{out}(t)$ | $V_{out}(t)$ |
| $S_{in3}$ | $V_{out}(t)$ | $V_{out}(t)$ | $V_{out}(t)$ |

GENERATING AN EQUIVALENT WAVEFORM MODEL IN STATIC TIMING ANALYSIS

BACKGROUND

Integrated circuit design has evolved into a specialized field often referred to as electronic design automation in which computers and computer aided design (CAD) techniques are used to automate the process of designing an integrated circuit (IC). An electronic circuit design is evaluated using device models. Device models often are implemented as design cells that describe the circuit behavior and connectivity of circuit elements, logic gates, and circuit blocks that may be included within a design. More complex cells may represent macros or a collection of gates and storage elements that implement more complex functions. An IC design may include many instances of a given cell. A computer software based simulation tool uses these cell-based models and interconnections to simulate operation of a circuit represented by the design.

Timing and signal integrity (SI) are increasingly important issues in integrated circuit design, particularly due to drastic scaling down of layout geometries and increase in operating frequencies. Static Timing Analysis (STA) tools are used to analyze whether a design meets timing constraints and SI requirements. STA involves determining the expected timing of a digital circuit to verify that all signals will arrive neither too early nor too late, and hence that proper circuit operation can be assured. For example, STA can be used to establish whether all paths within a design meet stated timing criteria, that is, that data signals arrive at storage elements early enough for valid gating but not so early as to cause premature gating. STA typically aims to find worst-case delay of a circuit over all possible input combinations.

Typically, in order to prepare a cell for use with a STA tool, the cell is pre-characterized as a function of parameters such as slew and delay and output load, for example. Characterization of a cell results in a simplified model of the cell suitable for use in STA. In general, characterization of a cell typically involves analog simulation of the cell using a suitable analog model of the cell. During analog simulation, an analog simulator configures a computer system to determine the behavior of the cell in response to input signal conditions by solving an analog system matrix representative of Kirchhoff's Laws. Each circuit element represented in the analog model can have an instantaneous influence on any other circuit element represented in the model and vice versa. As such, analog simulation typically is more complex and requires matrix based computation of complex mathematical equations, and therefore, takes far more time than STA.

STA typically aims to find worst-case delay of a circuit over all possible input combinations. Delay variations result in variation in the maximum possible operating frequency of an IC. Delay of a gate cell depends upon input signal slew and capacitive output load of the gate. However, delay also depends upon current flowing through transistors during switching, while charging or discharging the load. The current that flows during charging and discharging may depend upon processing variations during manufacturing and also may depend upon other factors such as voltage supply variations and heat during operation of the IC, for example. In order to account for these variations, STA for a given design cell is performed multiple times to estimate delay at various 'corners' such as best case and worst case corners. In a best case corner, smallest delay is considered, which implies a low capacitance and fast transistors, high voltage and low temperature. Conversely, in a worst case corner, highest delay is considered, which implies high capacitance and slow transistors, low voltage and high temperature.

An implicit assumption is that all waveform shapes reaching the input of an instance of a cell in a design resemble the shapes used in device characterization and can be accurately described by one or more predetermined parameters used in the characterization. However, as IC designs feature sizes reach deep sub-micron dimensions such as with sub-45 nm technologies, for example, waveform shape variations occur that are not readily described by the parameters used in pre-characterization of a device model. Waveform shape effect (WSE) refers to shape variations that are in addition to any waveform shapes encoded in a cell characterization library during pre-characterization of the cell. Some causes of these waveform shape changes include: noise-induced changes in waveform shape, particularly non-monotonic waveforms; long waveform tails, particularly in base delay calculations, often arising from long resistive interconnect; and back-Miller corrections for a following stage. Thus, the voltage waveforms observed in modern ICs may differ significantly from the voltage waveform assumptions of STA tools and often do not correlate with the waveforms used for cell characterization. As a result, conventional static timing analysis tools often are unable to capture non-idealities in the waveforms such as, for example, overshoots, spikes, ringing, etc.

Additionally, it is often difficult to exhaustively pre-characterize the cells for all possible loading conditions. Thus, approximate equivalent capacitance models are formed to generate represent loading due to interconnects between design cells, for example. Due to these approximations and the intrinsic limitations of the cell-based models, the generated output waveforms often do not match the real circuit behavior. The problem is more severe in the case of non-linear loading conditions, such as when other gate cells are coupled to the output of a driver cell as fan-out gates. The problem can be even further exacerbated due to large changes in transistor and interconnects characteristic in the presence of process variations.

Equivalent waveform models (EWMs) have been proposed to predict WSE during STA. See, for example, commonly assigned U.S. patent application Ser. No. 12/960,387, entitled Equivalent Waveform Model for Static Timing Analysis of Integrated Circuits, by Igor Keller et al. An EWM is a waveform that is equivalent to a more complex waveform e.g., a waveform that has noise induced changes or distortions due to Miller effects. An EWM has a shape that is suitable to cause a circuit element to which the EWM is applied during STA, to produce an output waveform that is the same as or substantially similar to an output waveform expected to be produced if the more complex waveform was to be applied to the same circuit element.

SUMMARY

In one aspect, a method is provided for use during static timing analysis of an integrated circuit design to produce an equivalent waveform model to represent a complex waveform provided during the analysis as input signal to a design cell coupled as a delay stage of an integrated circuit design. An analog model of an inner component is used to simulate the inner component to produce multiple analog simulation output characterization waveforms as a function of multiple input waveforms used to characterize the design cell. The analog model of the inner component also is used to simulate the inner component to produce an analog simulation output waveform as a function of the complex waveform. An equivalent waveform model is produced as a function of the multiple analog simulation output characterization waveforms and the analog simulation output waveform.

BRIEF DESCRIPTION OF THE DRAWINGS

FIGS. 7A-7B are illustrative conceptual diagrams to represent simulation involving characterization waveforms used to characterize a delay stage cell (FIG. 7A) and to represent simulation involving the complex waveform (FIG. 7B) and in accordance with some embodiments.

DETAILED DESCRIPTION OF EMBODIMENTS

Figure 1A:
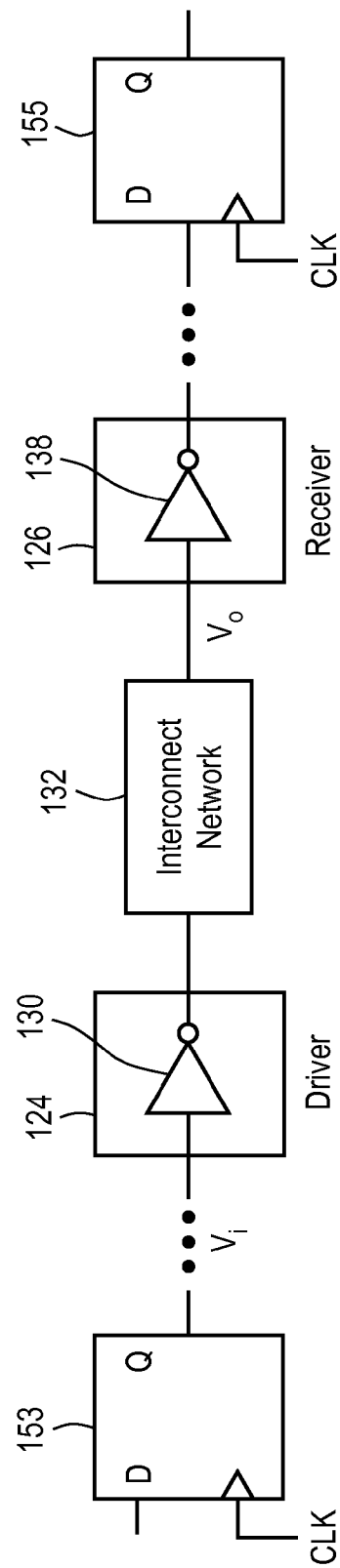
FIG. 1A is an illustrative block diagram of an example pair of stages of a netlist for an integrated circuit design.

The following description is presented to enable any person skilled in the art to make and use a method, system and article of manufacture to create an equivalent waveform model for use in static timing analysis. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Components in the drawings that are substantially identical to components in different drawings are labeled with identical reference numerals. Thus, the present invention is not intended to be limited to the embodiments shown, but is to be accorded the widest scope consistent with the principles and features disclosed herein.

Delay Stages

FIG. 1A is an illustrative block diagram of an example pair of stages 124, 126 of a netlist for an integrated circuit design. As used herein, a delay 'stage' comprises a unit of combinational logic, typically a design cell, for which timing and/or SI are determined during STA. A design cell coupled as a delay stage is a design cell that acts as a delay stage during one or more STA clocks cycles. More particularly, for example, propagation delay of a signal transition from one stage to a next stage in the design is determined for each stage in a delay path between sequential storage elements. During STA, such determinations may be made for each stage of each delay path between a set of sequential elements. During design of the IC, a STA tool configures a computer system to statically compute the timing delay of a signal between stages in a delay path.

A driver stage 124 may be modeled by a driver inverter cell 130 driving a signal over a delay path represented by a coupled RC interconnect network 132 and a load impedance of a receiver inverter cell 138. A first sequential element 153 launches clocked signals to the driver stage 124, and a second sequential element 155 captures signals produced by the receiver stage 126. It will be appreciated that the example in FIG. 1A is greatly simplified and that other stages (not shown) may be interposed between the sequential elements 140, 142.

A voltage source Vi having a waveform generated by a prior stage (not shown) is coupled to the input of driver cell 130. In response to the input voltage Vi and the coupled RC interconnect network 132, the driver 130 generates an output voltage Vo at the one or more outputs of a receiver stage 126. While the description herein may describe a model with a single output, it may be readily duplicated for a standard cell or logic gate with a plurality of outputs.

Figure 1B:
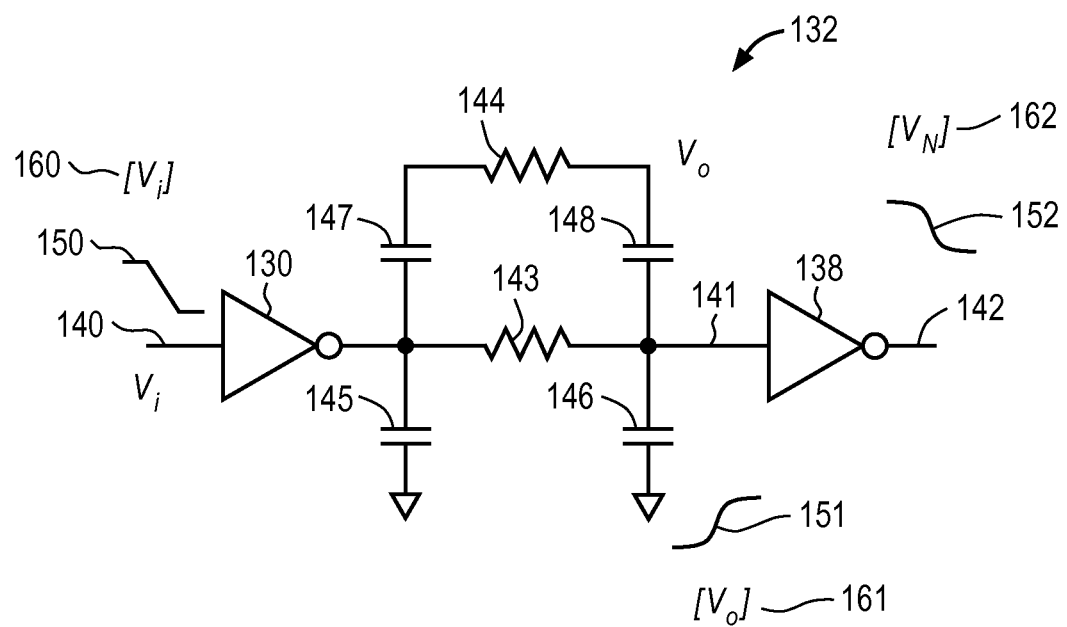
FIG. 1B is an illustrative schematic diagram of a circuit representative of the example pair of stages of FIG. 1A coupled together to illustrate the concept of waveform pushing.

FIG. 1B is an illustrative schematic diagram of a circuit representative of the example pair of stages of FIG. 1A coupled together to illustrate the concept of waveform pushing. Driver stage 124 includes the driver 130 and the RC interconnect network 132. Receiver stage 126 includes the receiver cell 138. The RC interconnect network 132 coupled between the driver 130 and the receiver 138 includes one or more resistors 143-144 and one or more capacitors 145-148 coupled together as shown. An input waveform 150 Vi is coupled into the driver 130 at node or net 140. The output driver and the RC interconnect network 132 produce an output waveform 151 Vo on node or net 141 that is coupled into the input of the receiver 138. The receiver 138, in response to the waveform 151, may generate an output waveform 152 $V_N$ on an output node or net 142.

Waveform Based Static Timing Analysis

Waveform based variational static timing analysis (WAVSTAN) of an electronic circuit may be used to determine timing information thereof. In this case, an output voltage is provided that behaves as a function of the input voltage with variation induced distortions using available characterized cell library models. Waveform based variational static timing analysis (WAVSTAN) conveys the actual shape of the output waveform voltage, such as example waveforms 150-152 shown in FIG. 1B, rather than simply reporting the delay and slew of a circuit.

Waveforms may be pushed along a path to simulate timing in a circuit. In this approach, a given input waveform is sequentially pushed through the various interconnects and logic networks of a circuit until it reaches an output. Complete waveforms are determined at each stage so that the actual shape of the waveform with respect to time is moved around across the gates and interconnects.

Referring again to FIG. 1B, for example, an input waveform 150 represented by a vector or matrix 160 is pushed through the driver 130 and the RC interconnect network 132 to generate the waveform 151 represented by a vector or matrix 161. Further, the waveform 151 is pushed through the receiver 138 to generate the output waveform 152 represented by a vector or matrix 162. The vectors or matrices 160-162 representing the waveforms may be simplified and/or compressed to improve the efficiency of the simulation computations. Generally, a waveform based static timing analysis includes: (a) extracting or receiving a layout (netlist) of an integrated circuit, including a plurality of logic gates and transistors; (b) dividing or partitioning the layout (netlist) into sub-layouts (sub-netlists); (c) pushing an input waveform through the various interconnects and logic networks of the circuit until it reaches an output of a stage; (d) deriving output voltage waveforms from input waveforms at each stage of waveform pushing.

Figure 2A:
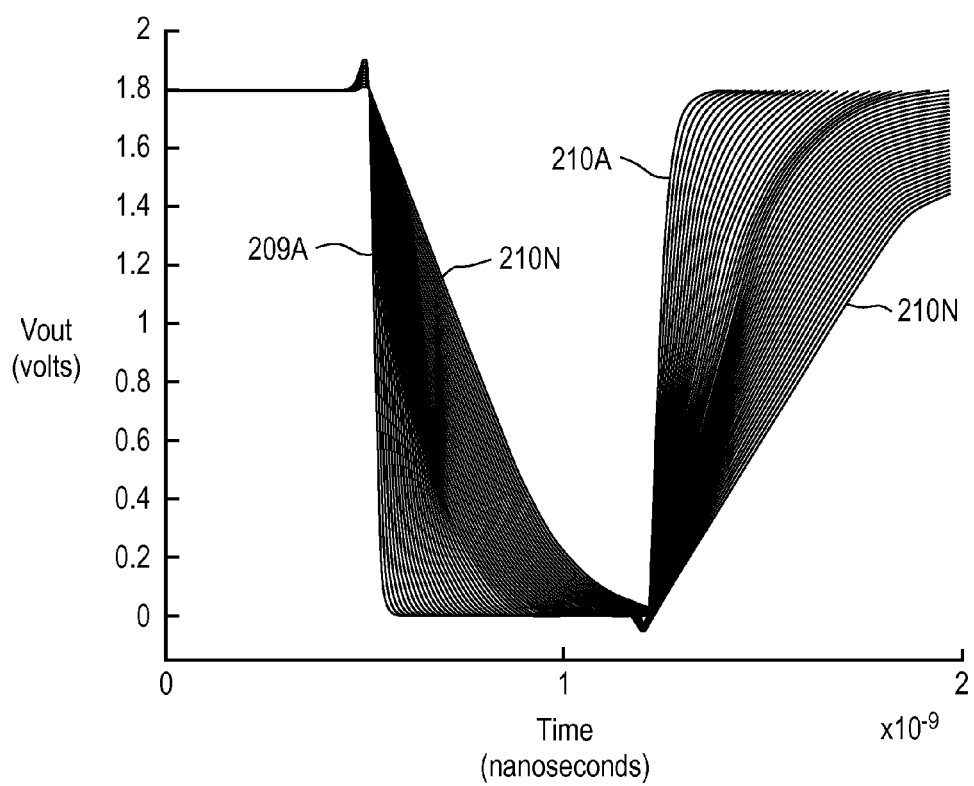
FIG. 2A illustrates example output waveforms that may be generated by a cell in response to corresponding input waveforms imparted to the waveform imparted to a stage.

FIG. 2A illustrates example output waveforms 210A-210N that may be generated by a cell in response to corresponding input waveforms 209A-20N imparted to a stage. In practice, the input waveform may have become distorted (not shown) when it arrives at the input of the receiver in the next stage due to cross-talk from aggressor waveform switching on nearby interconnects, for example. Full waveform-based static timing analysis can in principle capture all these effects. In practice, however, there are at least two difficulties implementing a waveform-based analysis. First, the cell libraries typically available are not capable of describing the response of the full gate to all the details of waveform shape. Second, most static timing tools do not store full waveform representations, but instead abstract the waveform in terms of an arrival time and slew representation.

Static timing analysis (STA) models for cells in a cell library are typically formed and characterized to measure slew rate of a rising input voltage on a sloped curve from 0.2 VDD (20% of power supply voltage VDD) to 0.8 VDD (80% of power supply voltage VDD) and for a falling input voltage from 0.8 VDD to 0.2 VDD, for example. Moreover, on the input voltage waveform and the output voltage waveform, models are typically formed and characterized to measure arrival time or delay at 0.5 VDD on each. Noise glitches or distortion in the input voltage waveform can make it difficult for former models to properly determine the slew rate of the input voltage waveform and/or the 0.5 VDD (50% of power supply voltage VDD) point in the input voltage waveform.

Figure 2B:
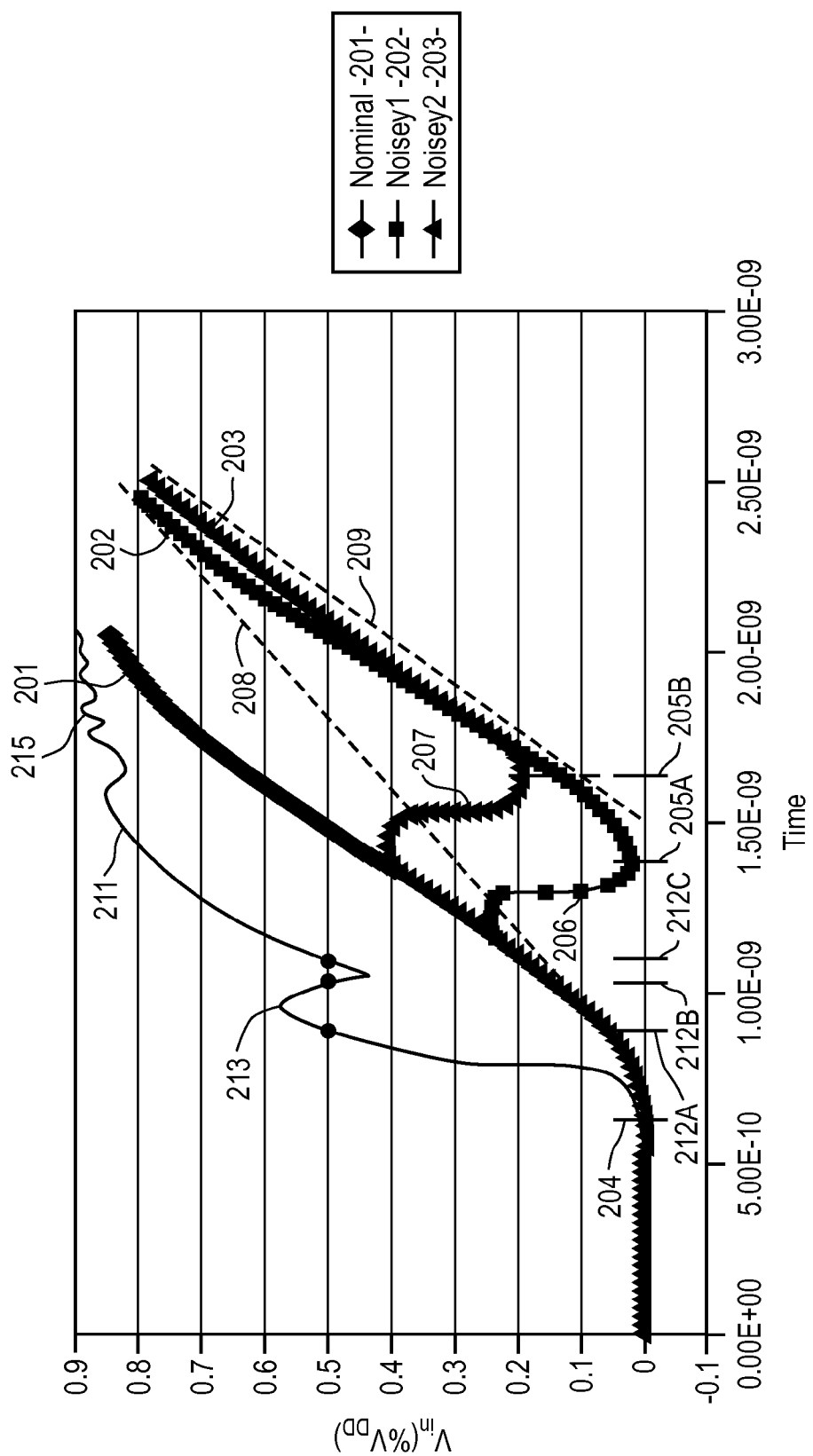
FIG. 2B illustrates exemplary input voltage Vin waveforms plotted as a percentage of VDD versus time.

FIG. 2B illustrates exemplary input voltage Vin waveforms 201-203 and 211 plotted as a percentage of VDD versus time. A Vin waveform 201 is a nominal waveform, without noise, smoothly rising from 0.2 VDD to 0.8 VDD. A simple input ramp from 0 volts to VDD volts having the same slope such as the waveform 201 ordinarily is used to characterize an example cell that represents a circuit element, gate, or circuit block during STA, for example. The waveforms 202-203, 211 are illustrative waveforms that are 'complex' relative to waveform 201 in that their shape cannot be reliably approximated as a ramp function. Waveforms 202-203, 211 each include a respective noise glitch 206-207, 213. The noise glitches 206-207 in input voltage waveforms 202-203 rise sufficiently to trigger an improper measurement of slew rate along the slope of line 208 instead of measuring slew rate along the slope of line 209. Moreover, an incorrect start time for waveforms 202-203 may be measured at time 204 instead of times 205A-205B.

The waveform 211 in FIG. 2B, includes a noise glitch 213 that causes the waveform to cross thrice over 0.5 VDD (50% of the power supply voltage VDD) at time points 212A, 212B, and 212C. With three different time points for 0.5 VDD crossing in the input waveform, it is difficult to determine which to use for delay in the generation of the output waveform. It will be appreciated that no particular waveform shape or specific set of features is required to make a waveform 'more complex', and that the waveforms 202-203 and 211 are merely examples of waveforms having characteristics making them more complex than the waveform 201.

During Static Timing Analysis (STA) the timing behavior of each path through an integrated circuit design is determined by abstracting it with a timing graph (TG) and propagating worst arrival time (AT) along the path. Two parameters, arrival time AT and slew rate S of a transition, can represent a voltage transition at an electrical node of the circuit. Propagation of the AT to the next node of the TG, requires delays to be computed for each arc of the TG. The delay and slew calculation to represent a voltage waveform at a node is usually performed by a delay calculator, a separate module of a static timing analyzer tool. The delay calculator (DC) analyzes a small sub-circuit of the design at a time. This sub-circuit is referred to as a stage. Each stage typically includes a driving gate, interconnect parasitics and one or more receiving gates.

Referring again to FIGS. 1A-1B, a goal of the delay calculator is to compute voltage transitions 151 (referred to as output transitions) at each receiver input 141 using a known transition 150 (referred to as input transitions) that are represented in terms of slew or slew rate at the inputs 140 of the driver 130. The time delay between input transitions 150 and output transitions 151 for every receiver 138 and slews of the output transitions 151 are determined and annotated back onto the timing graph (TG). The delay of a stage is a time difference between arrival time (AT) of an input waveform at an input of the stage (e.g., time at which voltage is 0.5 VDD) and arrival time of a corresponding output waveform at an output of that stage.

Typically, a lookup table based approach is used to determine delay of a stage based upon slew of an input waveform and output load capacitance. For example, a non-linear delay model (NLDM) provides a table that indexes slew rate to output capacitance. Cell delay ($t_{delay}$) is characterized for multiple different output capacitance values for each of multiple different slews. Since the actual slew of actual waveforms produced during STA differ from slew used to characterize the cell, interpolation may be required. More recently, composite current source models (CCSM) have been developed in which a table indexes slew and output capacitance to output current waveforms. During STA, the output current waveform is processed to determine delay. Also, effective current source models (ECSM) have been developed in which a table indexes slew and output capacitance to an output voltage waveforms. During STA, the output voltage waveform, is processed to estimate delay. In general, both CCSM and ECSM preserve detailed waveforms that result in more accurate delay estimation when compared with NLDM at the cost of additional computation time.

Referring again to FIG. 2B, the conventional way of calculating arrival time AT and slew S on a transition is now described. The arrival time AT is a time when a transition crosses a voltage threshold. The arrival time threshold voltage VAT is usually defined to be one half of the positive power supply voltage (VAT=0.5 Vdd). For example, the arrival time AT of waveform 201 is around 1.5 nano-seconds. The slew rate S is a difference between a low time point $t_L$ and a high time point $t_H$ when the transition crosses respectively a low voltage point $V_L$ and a high voltage point $V_H$.

The conventional slew rate S and arrival time AT can be mathematically defined using a parameterized functional in Equation A as follows:

$$J_{crs}[v(t),V_{thresh}] = \int_0^{Vdd} \delta(v-V_{thresh})t(v)dv \quad (1)$$

In expression 1, the lower case sigma $\delta$ is a Dirac delta function and the threshold voltage Vthresh is a parameter. The parameterized functional Jcrs associates a value to a transition (voltage as a function of time), and may be used to mathematically define the conventional arrival time AT with expression 2 and mathematically define the conventional slew rate S with Equation 3 as follows:

$$AT = Jcrs[v(t),V_{AT}] \quad (2)$$

$$S = Jcrs[v(t),V_L] - Jcrs[v(t),V_H] \quad (3)$$

The subscript crs is used to denote that the parameterized functional Jcrs is providing crossing time of the transitions at a certain voltage value. Other than the three time values of arrival time, slew rate, and crossing time, the details of the transitioning waveform are not captured in the conventional definition of slew rate S and arrival time AT.

This abstraction of a physical waveform transition by two parameters, slew rate S and arrival time AT, has been working fairly well in old process nodes. However, with advance of technologies and increase in interconnect resistance and crosstalk, the actual waveform shape is playing a more important role in timing analysis.

Referring now to FIG. 2B, waveforms 201-203 illustrate three different waveform transitions that have the same arrival time and the same slew rates. The respective transitions in these waveforms represent an output of an inverter driving different capacitive loads. As can be seen by comparing waveforms 202-203 against waveform 201 in the FIG. 2B, the conventional slew S and arrival time AT parameters are not good characteristics of the waveform in terms of receiver output arrival time.

A conventional delay calculator DC may use a cell delay model which is based on pre-characterized cell delay and output slew as functions of input slew and capacitive load. The fact that only a single parameter of the input waveform is used in DC is contributing to possibly high inaccuracy in delay calculation.

A model is proposed herein that allows extraction of values for slew rate S and arrival time AT in such a way that it reduces error in the calculation of arrival time AT observed at the next stage (output of receiver) when compared to the arrival time of an analog simulation.

It is desirable to provide an equivalent waveform model (EWM) that can generate an equivalent waveform from a noisy waveform so that that arrival time and/or delay time can be more accurately determined from the equivalent waveform.

The equivalent waveform model (EWM) may be used as a model in a gate delay calculator within a static timing analyzer, such as for example, the static timing analyzer and gate delay calculator.

Equivalent Waveform Model

Figure 3:
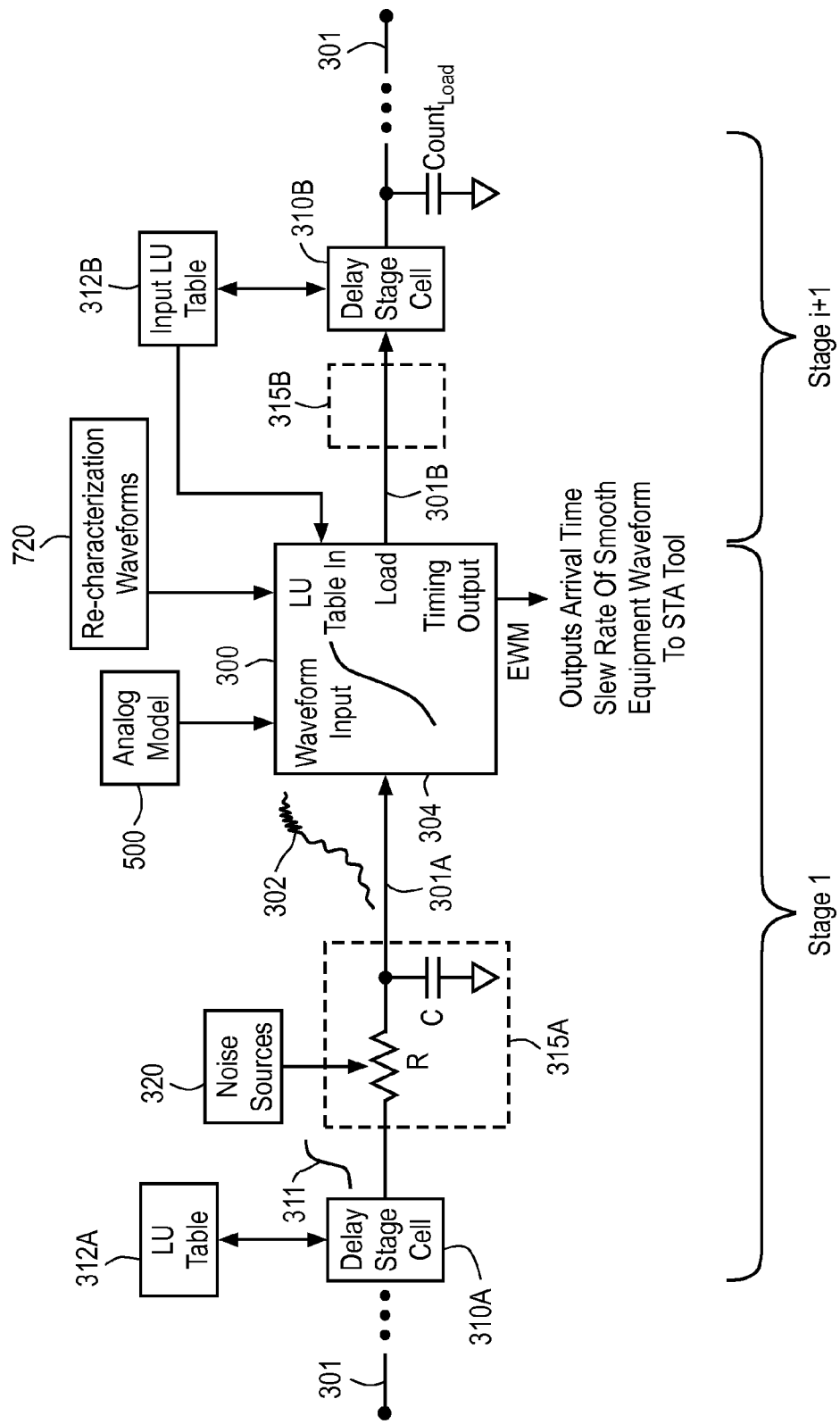
FIG. 3 is an illustrative drawing of a netlist configured for use with an equivalent waveform model (EWM) generator used to produce an equivalent waveform model (EWM) to improve accuracy in delay calculations in a STA tool in accordance with some embodiments.

FIG. 3 is an illustrative drawing of a portion of an example netlist configured for use with an equivalent waveform model (EWM) generator 300 used to produce an equivalent waveform model (EWM) to improve accuracy in delay calculations in a STA tool, especially in presence of nonlinear or noisy input waveforms, in accordance with some embodiments. During STA, the EWM generator 300 generates an EWM and stores it in a computer readable storage device, at different stages along delay paths within the design. The example netlist portion includes a design cell coupled as a delay stage 310A that is coupled to provide signals via interconnect network 315A to design cell coupled as a delay stage 310B. A look-up table 312A provides an input look-up table of delay values and capacitive load values indexed to slew values for delay stage cell 310A. A look-up table 312B provides an input look-up table of delay values and capacitive load values indexed to slew values for design cell coupled as a delay stage 310B. In some embodiments, the look-up tables 312A, 312B constitute a non-linear delay model (NLDM) of the respective design cell coupled as a delay stages 310A, 310B. Alternatively, CCSMs or ECSMs may be used, for example. However, in accordance with some embodiments, a waveform represented in look-up table 312B is generated using the EWM generator 300.

The EWM generator 300 receives a complex (e.g., noisy) waveform 302 and generates a smooth equivalent waveform model 304. A smooth EWM 304 is used to determine a slew rate value which is output by the EWM 300 for use by the static timing analyzer to calculate arrival time, i.e. delay. For example, during STA, the delay stage 310A may generate a smooth waveform 311 at its output that is corrupted due to noise produced by various noise sources 320 such as aggressor signals along the signal path i through the model of the interconnect 315A resulting in the complex waveform 302. Example instances of complex waveforms are shown in FIG. 2B. Example instances of smooth waveforms 304 are shown in FIG. 2A. Thus, in this example, the EWM generator 300 receives a complex waveform, converts it to a smooth EWM and converts the EWM to a slew rate, which is provided to the STA for SI and/or timing analysis of the next stage 310B.

Generation of Equivalent Waveform Model

Figure 4A:
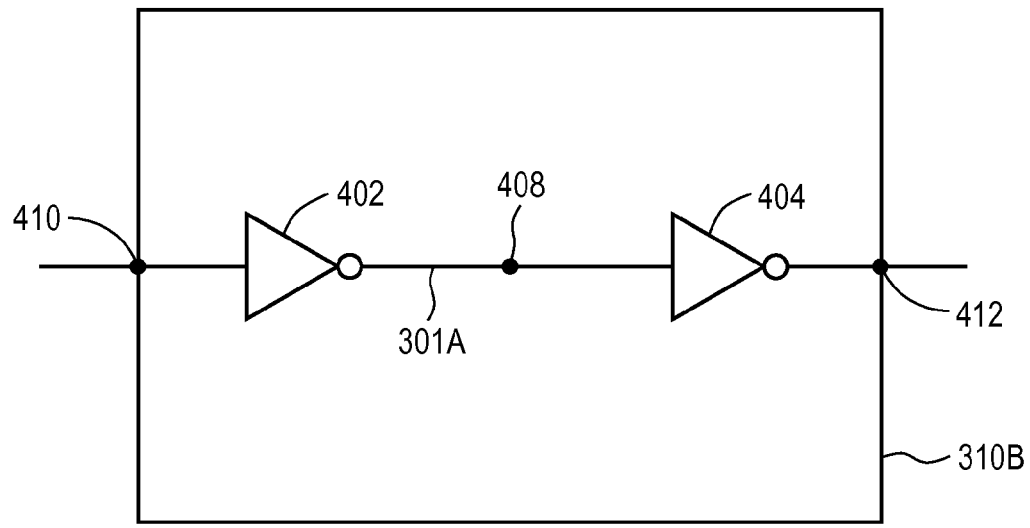
FIG. 4A is an illustrative gate level schematic diagram showing internal gate level circuit components within the example delay stage cell of FIG. 3.

FIG. 4A is an illustrative gate level schematic diagram showing internal gate level circuit components within the example design cell coupled as a delay stage 310B. The delay stage 310B includes first and second inverters 402, 404 that are coupled in series. Node 408 is disposed on a signal path 301A between the first and second inverters. Input node 410 is coupled to receive an input signal produced by the prior delay stage 310A that may be distorted due to noise sources 320, for example. Output node 412 is coupled to provide an output signal to a next delay stage (not shown). It will be appreciated that principles described herein are applicable regardless of the details of the circuitry within the delay stages. The inverters 402, 404 shall be referred to herein as 'inner' inverters because they are within the delay stage 310B. Similarly, node 408 shall be referred to as an 'inner' node since it is within the delay stage 310B. Recall that the STA tool performs SI and/or timing analysis on a stage-by-stage basis. Moreover, a typical prior STA tool performs analysis for the overall stage 310B rather than individually for each of the inner inverters 402, 404 within the stage 310B.

Figure 4B:
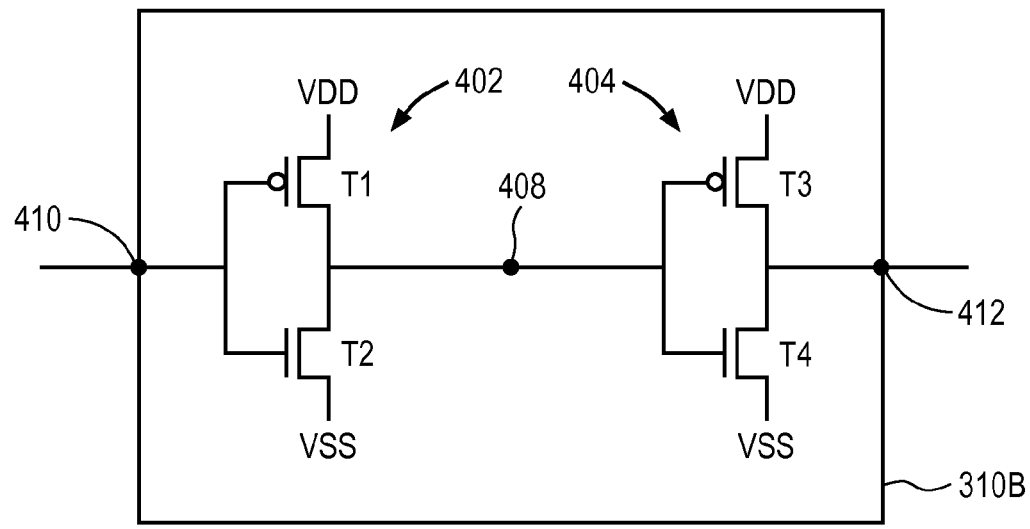
FIG. 4B is an illustrative transistor level schematic diagram showing internal transistor level circuit components within the example delay stage cell of FIG. 3.

FIG. 4B is an illustrative transistor level schematic diagram showing internal transistor level circuit components within the example design cell coupled as a delay stage 310B. Inverter 402 comprises transistors T1 and T2. Inverter 404 comprises transistors T3 and T4. Note that unlike the delay stage cells of FIGS. 1A-1B, which contain one inverter each, the delay stage cell 310B of FIGS. 3-4A contains two inverters. Inverter 402 is the component of the design cell coupled as a delay stage 310B that first receives signals input from a prior delay stage (not shown) and that produces inner signals on inner node 408 in response to the received input signals. It will be appreciated that in characterizing a cell for STA, functionality of the cell typically is abstracted to models of the cell such as NLDM, CCSM or ECSM represented in tables used to determine the delay of a cell as a function of input waveform slew and capacitive load. As such, during STA in the past, internal circuitry details of the cell, such as inverters 402-404 and transistors T1-T4, were abstracted out in that they were subsumed within the tables.

Figure 5:
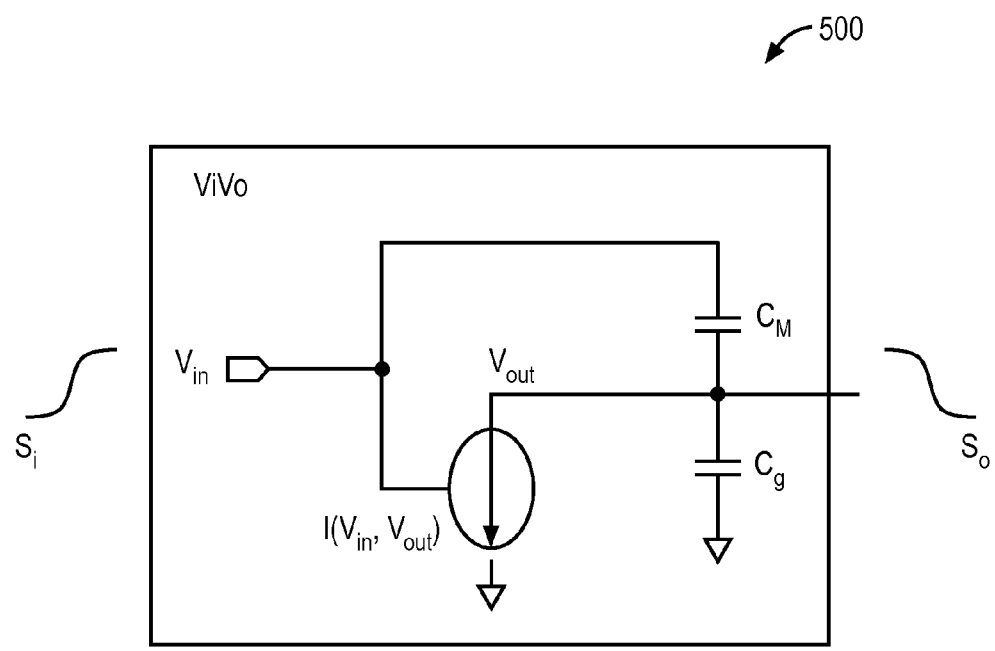
FIG. 5 is an illustrative circuit diagram of an analog model of the first inner inverter of the delay stage cell of FIGS. 3 and 4A-4B.

FIG. 5 is an illustrative circuit diagram of an analog model 500 of the first inner inverter 402 of the design cell coupled as a delay stage 310B of FIGS. 3 and 4A-4B. In some embodiments, the analog model is a current model of the type described in commonly assigned U.S. Pat. No. 7,359,843 entitled, Robust Calculation of Crosstalk Delay Change in Integrated Circuit Design, issued Apr. 15, 2008, invented by Igor Keller et al., which is expressly incorporated herein in its entirety by this reference, The current model, which is referred to herein as the 'ViVo' model, models the current drawn by an input pin (e.g., 410) of a channel-connected component (CCC) (e.g., the inverter 402 comprising T1 and T2) for various voltage values on the input and output pins. A CCC consists of transistors connected to each other by their drains or sources. This current model allows high accuracy of analysis due to the fact that a current drawn by a gate during switching can be well represented by a voltage-controlled current source, which is a function of instantaneous voltages on the input and output: Id=I(Vi, Vo). In some embodiments, the analog model is implemented as a two dimensional (2-D) current table, describing the nonlinear (voltage-controlled) current source. More particularly, the value of an output voltage Vout of an analog current model of a CCC depends upon a combination of a value of an input voltage Vin provided to the analog current model and a value of current drawn through the analog current model. In addition to the 2-D current table the analog model also includes two capacitors modeling, respectively, the Miller $C_M$ and ground $C_g$ capacitance. Since the analog current table is a function of instantaneous voltages and not dependent on transition history, its generation can be done through a series of DC simulations using an analog simulation tool such as SPICE and can be very fast. The capacitances $C_M$ and Cg can be obtained in some embodiments as a sum of parasitic capacitances of devices in the gate. In other embodiments they can be computed using transient simulation in SPICE, for example. As explained more fully below, in some embodiments the capacitance Cg can obtained from a specific set of simulation waveforms and the current source model Id=I(Vi, Vo).

As explained more fully below, the analog model 500 is used with a simulation tool to configure a computer system to produce an output waveform in response to the complex waveform 302, for example, propagated to the design cell coupled as a delay stage 310B. Analog signals vary continuously meaning that the value of the signal at any point in time may be any value from within a continuous range of values. The identified analog model permits a simulation tool to determine a continuous range of output waveform values that make up an output waveform based upon a continuous range of input waveform values that make up a corresponding input waveform. Persons skilled in the art will appreciate, of course, that analog simulation also may represent continuous signals as discrete-event signals that are represented as piecewise constant versus time, meaning that a signal holds its value for a period of time before jumping to a new value.

Figure 6:
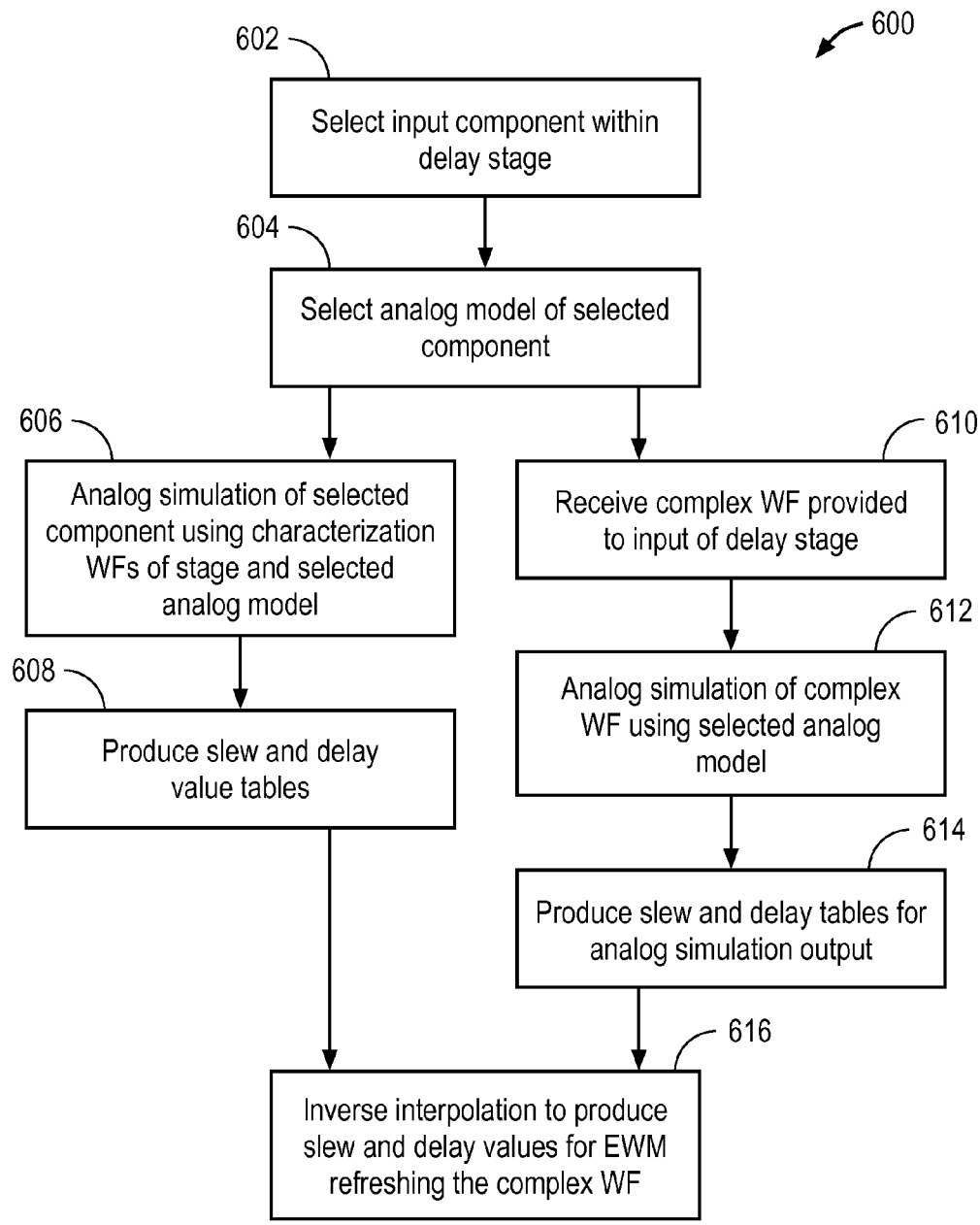
FIG. 6 is an illustrative flow diagram representing a process to produce an EWM corresponding to a complex waveform input to a delay stage during STA in accordance with some embodiments.

The use of the analog model 500 to produce an EWM of a complex waveform is described with reference to FIGS. 6 and 7A-7B. FIG. 6 is an illustrative flow diagram representing a process 600 performed by the EWM generator 300 to produce an EWM 304 corresponding to a complex waveform 302 input to a delay stage during STA in accordance with some embodiments. FIGS. 7A-7B are illustrative conceptual diagrams to represent simulation involving the complex waveform (FIG. 7A) and to represent simulation involving characterization waveforms used to characterize a delay stage (FIG. 7B) in accordance with some embodiments.

It will be appreciated that a computer is configured to implement the EWM generator 300 to perform the acts specified for the modules of FIG. 6. In module 602, an input component internal to the delay stage cell 310B is selected. In some embodiments, the input component consists of a channel connected component (CCC) that is coupled within the delay stage to receive an input waveform. In this example, the input component is the first inverter 402, which is a single CCC. Referring to FIGS. 6 and 7A, a non-linear analog model 500 of the selected input component that is suitable for use with a circuit simulation tool to simulate the analog behavior of the selected component is identified in module 604. The analog model may be identified from a library of analog models encoded in a computer readable storage device, for example.

In module 606, an analog simulation tool such as a SPICE simulator, is used with the analog model to configure a computer system to simulate operation of the selected input component in response to multiple characterization waveforms. More specifically, referring to FIG. 7A, during module 606, a set of multiple characterization waveforms used to characterize the delay stage 310B for STA are input to the analog model 500 so as to produce a set of multiple characterization output waveforms during the simulation in module 606. The operations of module 606 may be performed at the same time as the STA analysis of the stage in question or they may be performed in an offline pre-characterization step and the tables generated stored for future use.

The multiple output characterization waveforms 722 are converted to slew and delay values in module 608 that are represented in slew table 714 and delay table 716. The output characterization waveform slew and delay tables set forth different slew values and corresponding different delay values for different parameters. Two tables are created. The slew table 714, represents the output slew of the first input component as a function of the parameters input slew and capacitive loading of the component. In the case that the delay cell is a multi-stage cell, the only parameter may be input slew because the internal cell loading is known. The delay table 716 represents the delay of the first internal delay stage as a function of the same parameters. Thus, a characterization of the STA behavior of the selected internal component is constructed in steps 610 and 612 in terms of the characterization waveforms used to characterize the delay stage 310B of which the selected delay component (e.g., inverter 402) is a constituent.

Referring to FIG. 6 and FIG. 7B, in module 610, a complex waveform 302 is identified that is provided to an input of stage 310B in the course of STA. In module 612, the identified complex waveform is input to the analog model 500 so as to produce an output waveform 710 that corresponds to the complex waveform 302. The output waveform 710 corresponding to the complex waveform 302 is converted to slew values 724 and delay values 726 in module 614 An inverse interpolation performed in step 616 between the slew and delay values that correspond to the simulation output values 724, 726 produced in module 614 in response to the complex waveform 302 on the one hand, and the and the slew values and delay values in tables 714, 716 for the multiple output characterization waveforms produced in module 608 on the other hand to determine slew and arrival time parameters that define the EWM for the complex waveform 302. Table 714 is a mapping of input slew, and load on the first delay stage, to output slew of the first delay stage 402. Given the computed slew 724 of the first delay stage 402 in response to the complex waveform 302, this table may be inverted, using a conventional interpolation, to obtain the slew of the equivalent waveform. Given the slew of the equivalent waveform, since the table 716 described delay of the first delay stage 402 as a function of equivalent slew and possibly load on the first delay stage, a delay may be computed. Subtracting this delay from the delay 716 of the complex waveform 302 produces a difference that is used to determine the arrival time of the equivalent waveform.

Figure 8:
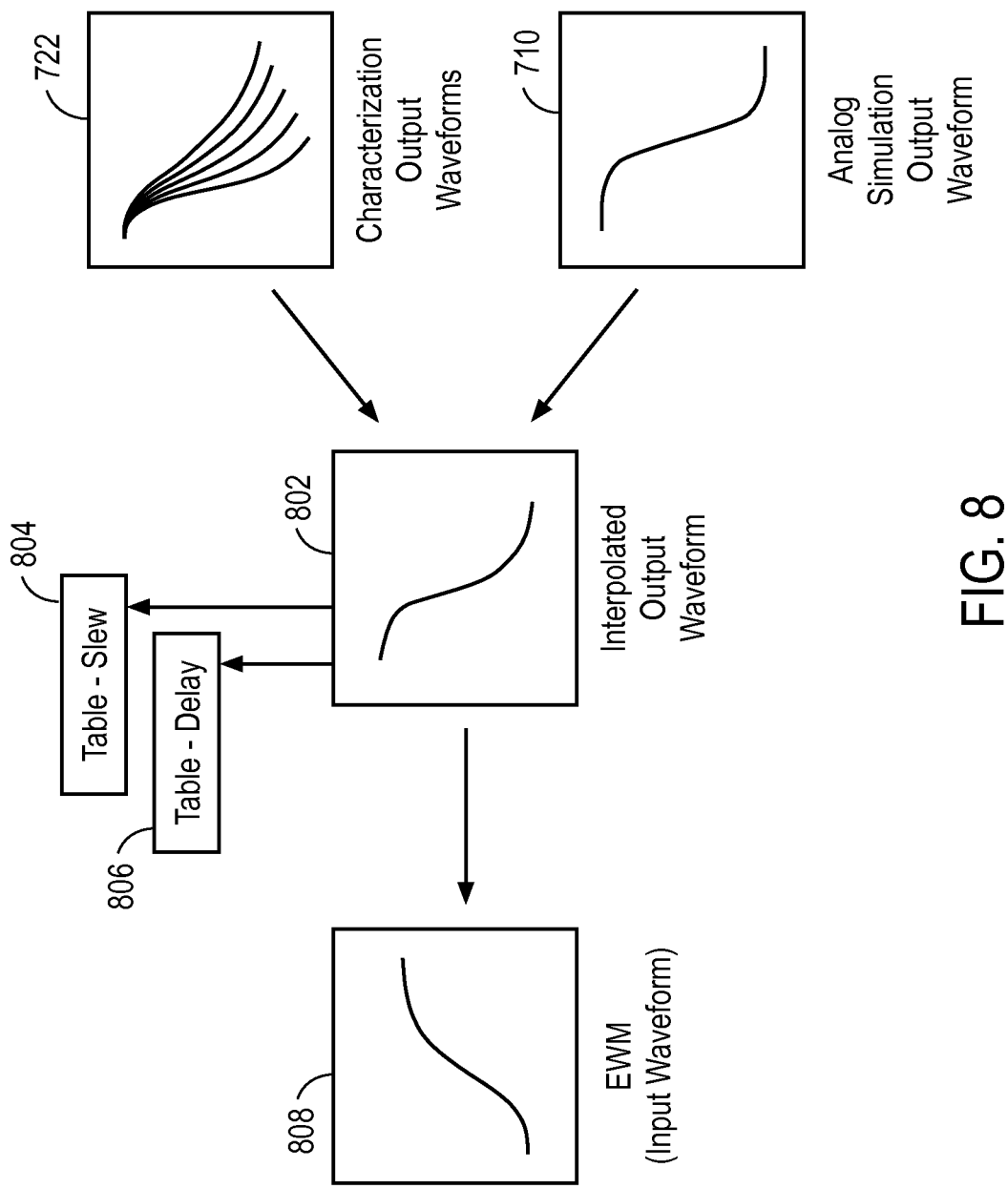
FIG. 8 is an illustrative drawing representing the inverse transformation in accordance with some embodiments.

FIG. 8 is an illustrative drawing representing the inverse transformation of module 616 in accordance with some embodiments. Output characterization waveforms 722 are represented by tables of values 714, 716. As explained above, the output waveforms 722 are produced using modules 606, 608 through the analog simulation using an analog model 500 of the selected inner component 402, using characterization waveforms 720 for the selected delay cell 310B. An output waveform 710 is represented by values 724, 726. As explained above, the values 724, 726 that represent an analog simulation output waveform 710 are produced by modules 610-614 through analog simulation using an analog model 500 of the selected inner component 402 of a complex waveform 302 received by the selected delay cell. The EWM 302 is generated to represent an input to the selected delay cell 302 through inverse interpolation of the characterization output waveforms 722 and the analog simulation output waveform 710.

More particularly, an interpolation between the multiple characterization output waveforms 722 and the analog simulation output waveform 710 produces an interpolated output waveform 802. A slew table 804 and a delay table are produced to represent the interpolated waveform 802. The slew table 804 representing the interpolated waveform is inverted to generate the slew S0 of the EWM input waveform 808.

Figure 9A:
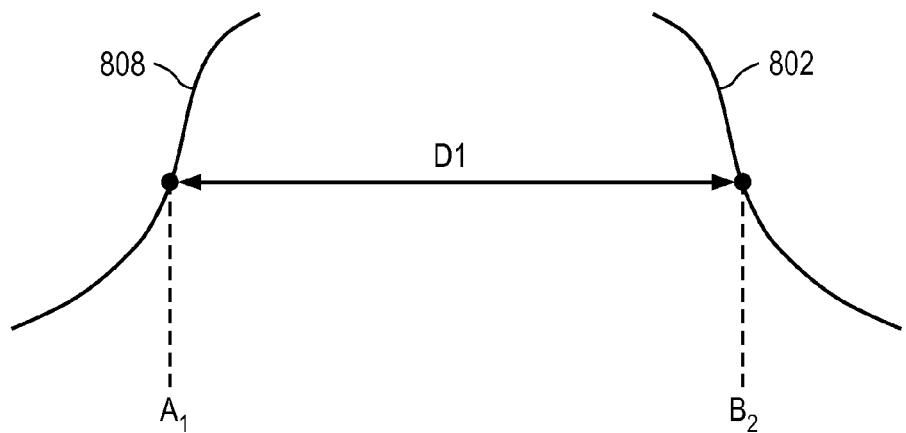
FIGS. 9A-9B are illustrative drawings showing delay between arrival times of the EWM and interpolated waveform (FIG. 9A) and showing delay between arrival times of the complex waveform and the waveform generated through analog simulation (FIG. 9B) in accordance with some embodiments.
Figure 9B:
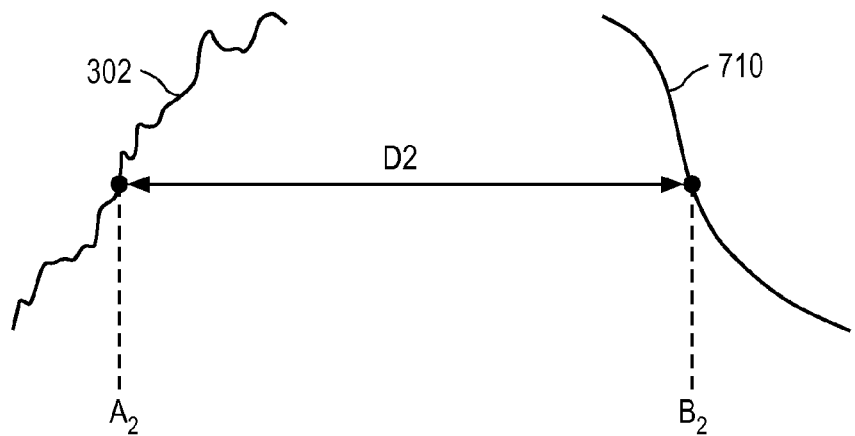

FIGS. 9A-9B are illustrative drawings showing delay between arrival times of the EWM 808 and interpolated waveform 802 (FIG. 9A) and showing delay between arrival times of the complex waveform 302 and the waveform generated through analog simulation 710 (FIG. 9B) in accordance with some embodiments. Referring to FIG. 9A, the delay table 806 indicates the delay D1 of the EWM 808 as a function of the slew S0. However, the arrival time A1 of the EWM 808 and the interpolated waveform 802 is unknown. It is assumed that the arrival time A2 of the complex waveform 302 is known. Referring to FIG. 9B, it is assumed that the output arrival time of the analog simulation waveform 710, B2, and the input arrival time of the complex input waveform 302, A2, are known. The delay D2 of the analog simulation waveform delay is D2=B2−A2. To fully specify the equivalent waveform 808 it is also necessary to determine its input arrival time A1. It is assumed that values for A2 and D2 are known from the analog simulation, By definition, the interpolated waveform 802 and the analog waveform 710 have the same output arrival times, B2. Moreover, A1+D1=B2 and also A2+D2=B2. Therefore A1+D1=A2+D2, and A1=A2+(D2−D1).

Adjustments for Non-Monotonic Analog Simulation Output Waveforms

Figure 10A:
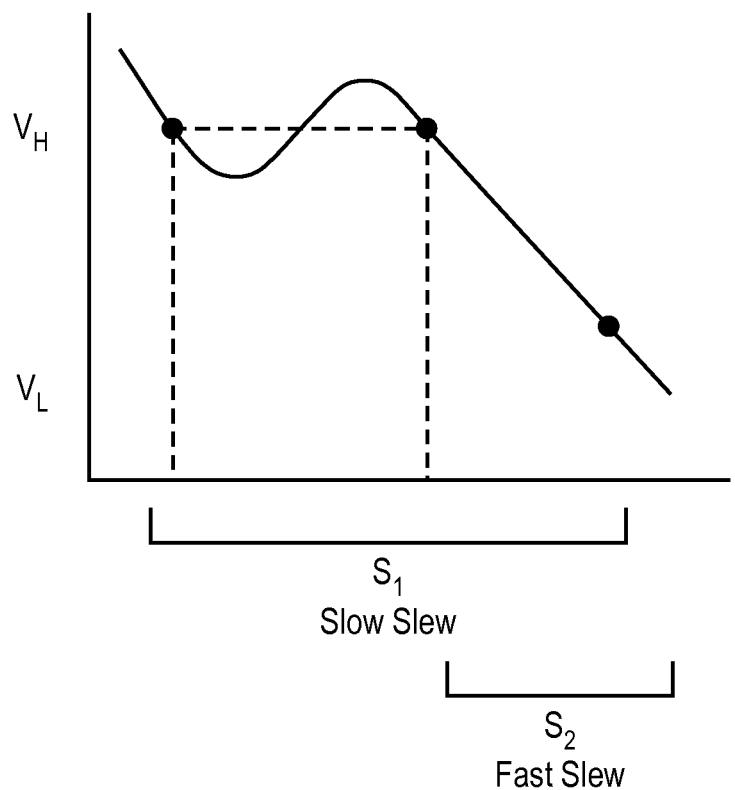
FIGS. 10A-10B are illustrative drawings representing examples of non-monotonic forms of an analog output waveform in accordance with some embodiments.
Figure 10B:
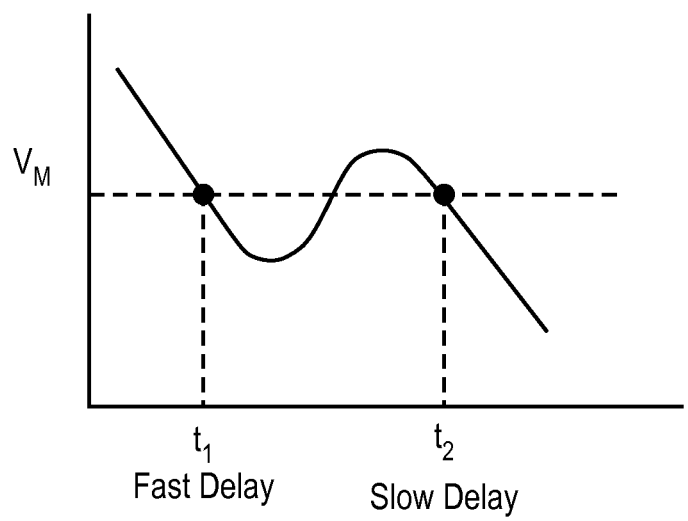

FIGS. 10A-10B are illustrative drawings representing examples of non-monotonic forms of analog output waveform 710 in accordance with some embodiments. FIG. 10A shows an example of a non-monotonic output signal that has ambiguity associated with a high crossing VH that might be e.g. 80% of VDD. FIG. 10B shows an example of a non-monotonic output signal that has ambiguity associated with a midpoint delay threshold VM. In the case of a complex waveform 302 that is non-monotonic it can occur in some situations that the one-stage propagated analog simulation waveform 710 also is non-monotonic. If this non-monotonicity occurs at threshold points used to define the delay or slew, e.g., VH or VM, ambiguity in the definition can be introduced. Two potential ways to resolve the ambiguity are explained below.

Figure 11:
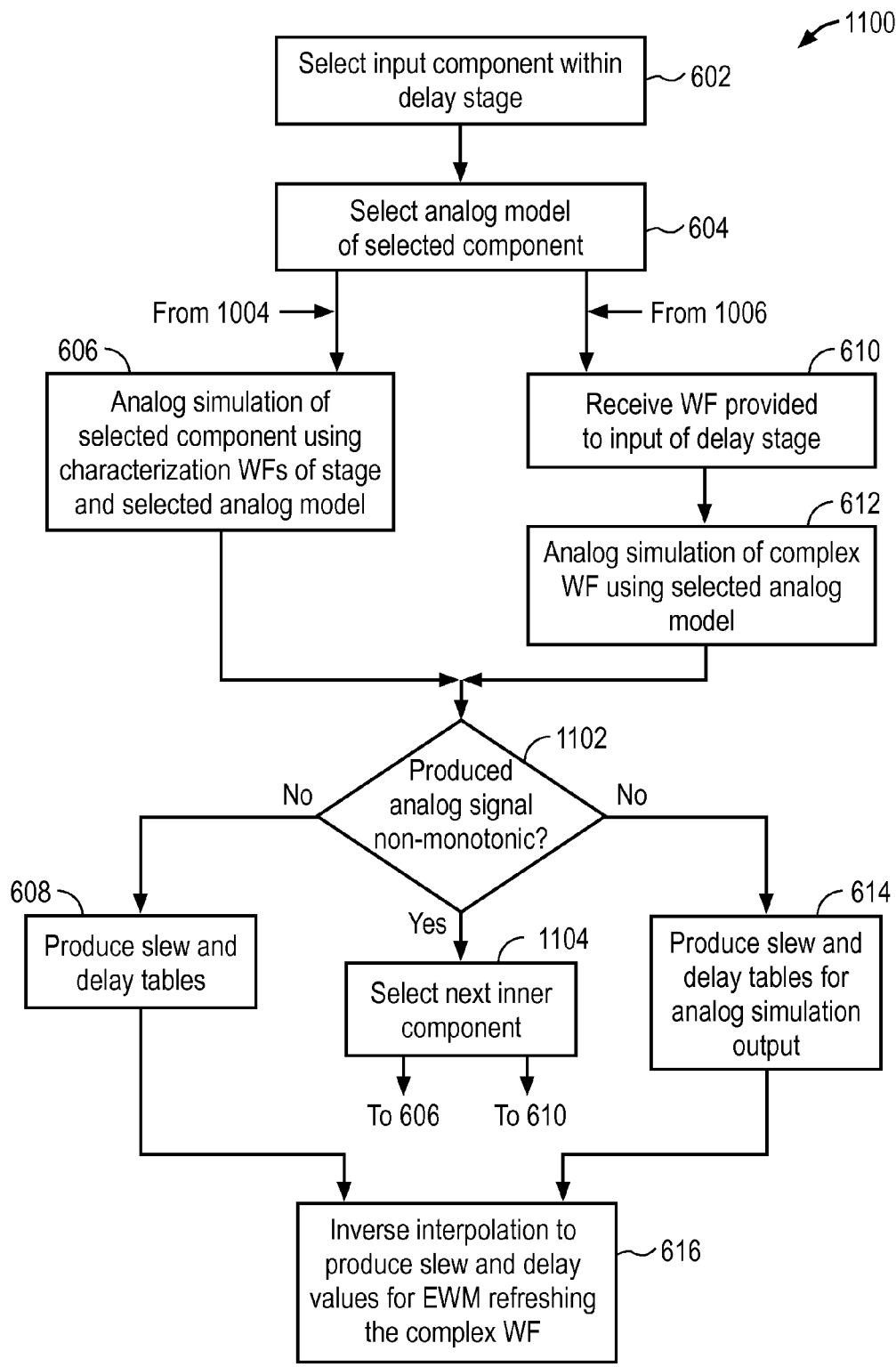
FIG. 11 is an illustrative flow diagram to produce an EWM corresponding to a complex waveform input to a delay stage during STA and also includes modules of a process to implement a first approach to resolving ambiguity resulting from non-monotonicity in a simulated analog output waveform in accordance with some embodiments.

FIG. 11 is an illustrative flow diagram that includes modules of FIG. 6 and also includes modules of a process 1100 to implement a first approach to resolving ambiguity resulting from non-monotonicity in a simulated analog output waveform in accordance with some embodiments. For brevity, only modules of FIG. 10 that differ from modules of FIG. 6 are described. Decision module 1102 determines whether the analog output waveform 710 produced using a first inner component, e.g., inner component 402 of FIGS. 4A-4B, is monotonic. If the output waveform 710 is determined to be monotonic, then control flows as described with reference to FIG. 6. If the output waveform 710 is determined to be non-monotonic, then module 1104 selects a next inner component e.g., inner component 404 of FIGS. 4A-4B. Modules 606 and 608 perform characterization of the next selected inner component. The non-monotonic waveform produced by the first selected component is propagated to the next selected inner component, and modules 610 and 612 use the analog model to produce analog output waveform in response to the output waveform of the first selected component. Referring to FIGS. 4A-4B, for example, the result would be that the delay and slew values used for construction of the EWM are taken at node 412 instead of node 408, if the waveform at node 408 is determined to be non-monotonic.

Figure 12:
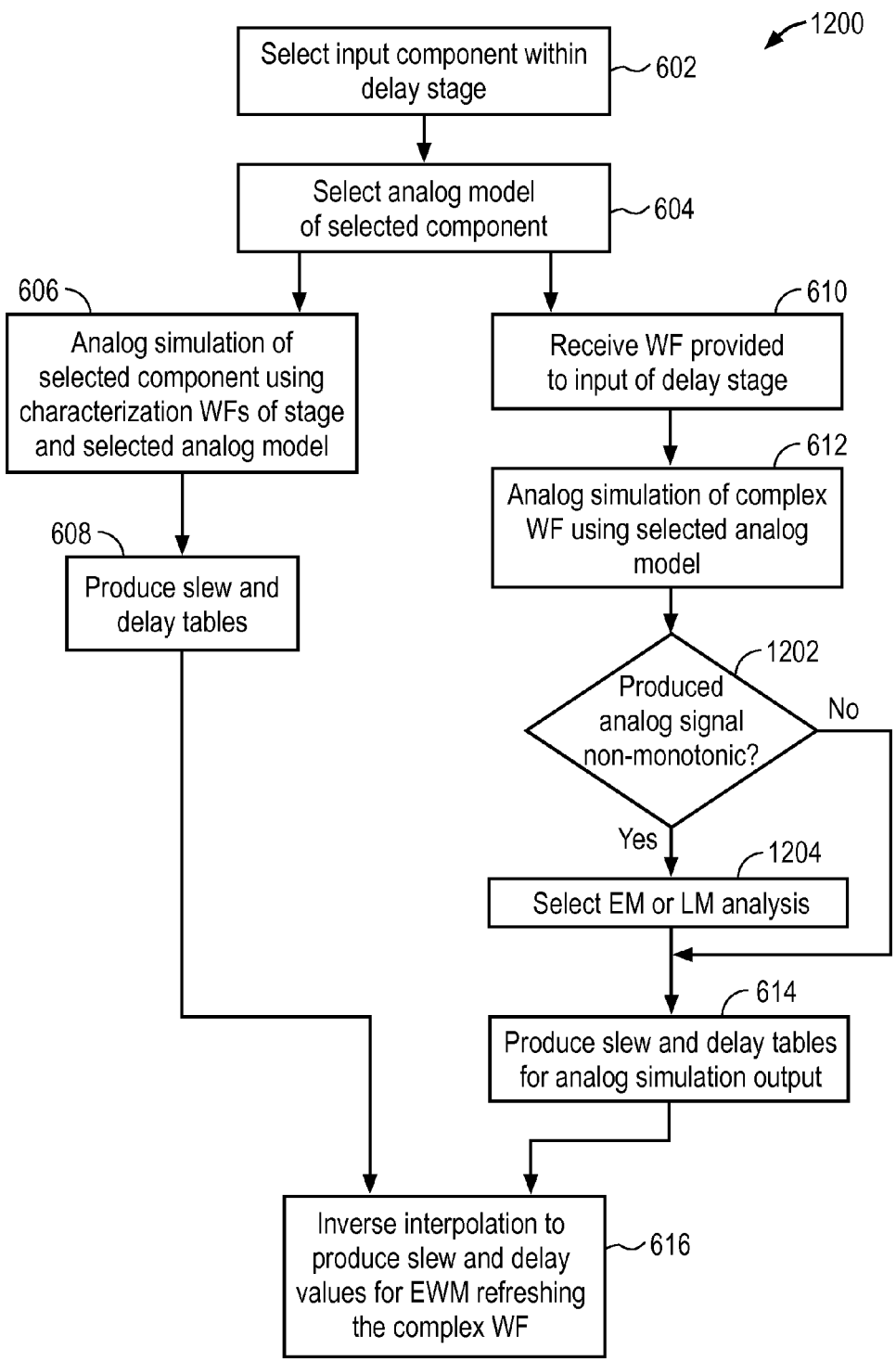
FIG. 12 is an illustrative flow diagram to produce an EWM corresponding to a complex waveform input to a delay stage during STA and also includes modules of a process to implement a second approach to resolving ambiguity resulting from non-monotonicity in a simulated analog output waveform in accordance with some embodiments.

FIG. 12 is an illustrative flow diagram that includes modules of FIG. 6 and also includes modules of a process 1200 to implement a second approach to resolving ambiguity resulting from non-monotonicity in a simulated analog output waveform in accordance with some embodiments. Again for brevity, only modules of FIG. 12 that differ from modules of FIG. 6 are described. Decision module 1202 determines whether the analog output waveform 710 produced using a first inner component is monotonic. If the output waveform 710 is determined to be monotonic, then control flows as described with reference to FIG. 6. If the output waveform 710 is determined to be non-monotonic, then module 1204 makes a user-controllable selection is made between a early mode (EM) arrival time analysis and late mode (LM) arrival time analysis. Module 614 produces slew table values and delay table values as a function of the selected analysis. For example, referring to FIGS. 10A-10B, if late mode analysis is selected, then for an ambiguity with the high crossing VH, the conservative engineering choice is to choose the slow slew S1 in FIG. 10A. Also, for late mode analysis, if there is ambiguity around the midpoint delay threshold VM, then the conservative engineering choice is to select the arrival time T2 in FIG. 10B. Conversely, for early-mode analysis, conservatism requires choosing the fast conditions, the fast slew S2 in FIG. 10A and fast arrival T1 in FIG. 10B.

Determining Capacitance Values

Referring again to FIG. 5, the analog model of the selected component includes a Miller capacitance $C_m$, and a pin capacitance $C_g$. The Miller capacitance $C_m$ generally is known from the characterization of the ViVo model. The load capacitance CL generally is known from the analysis of the downstream stage. In some case the internal capacitance value $C_g$ is not known from characterization of the ViVo model, but as we now discuss can be determined as a function of the analog model and an ECSM, stored in a computer readable storage device, associated with the selected component.

Figures 13A, 13B:
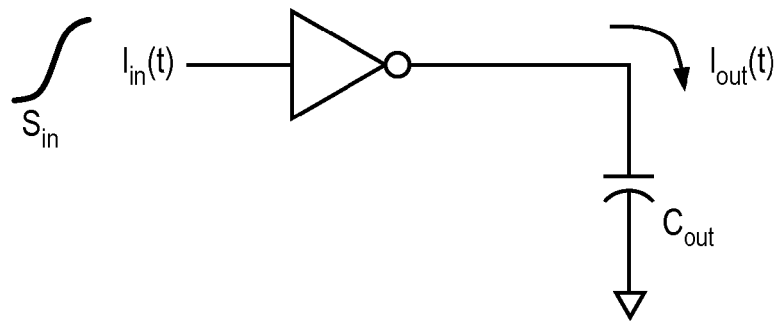
FIGS. 13A-13C show illustrative diagrams representing input signal transition and output current of an example inverter with a capacitive load (FIG. 13A) and an example ECSM table for the inverter (FIG. 13B) and corresponding example waveforms (FIG. 13C).
Figure 13C:
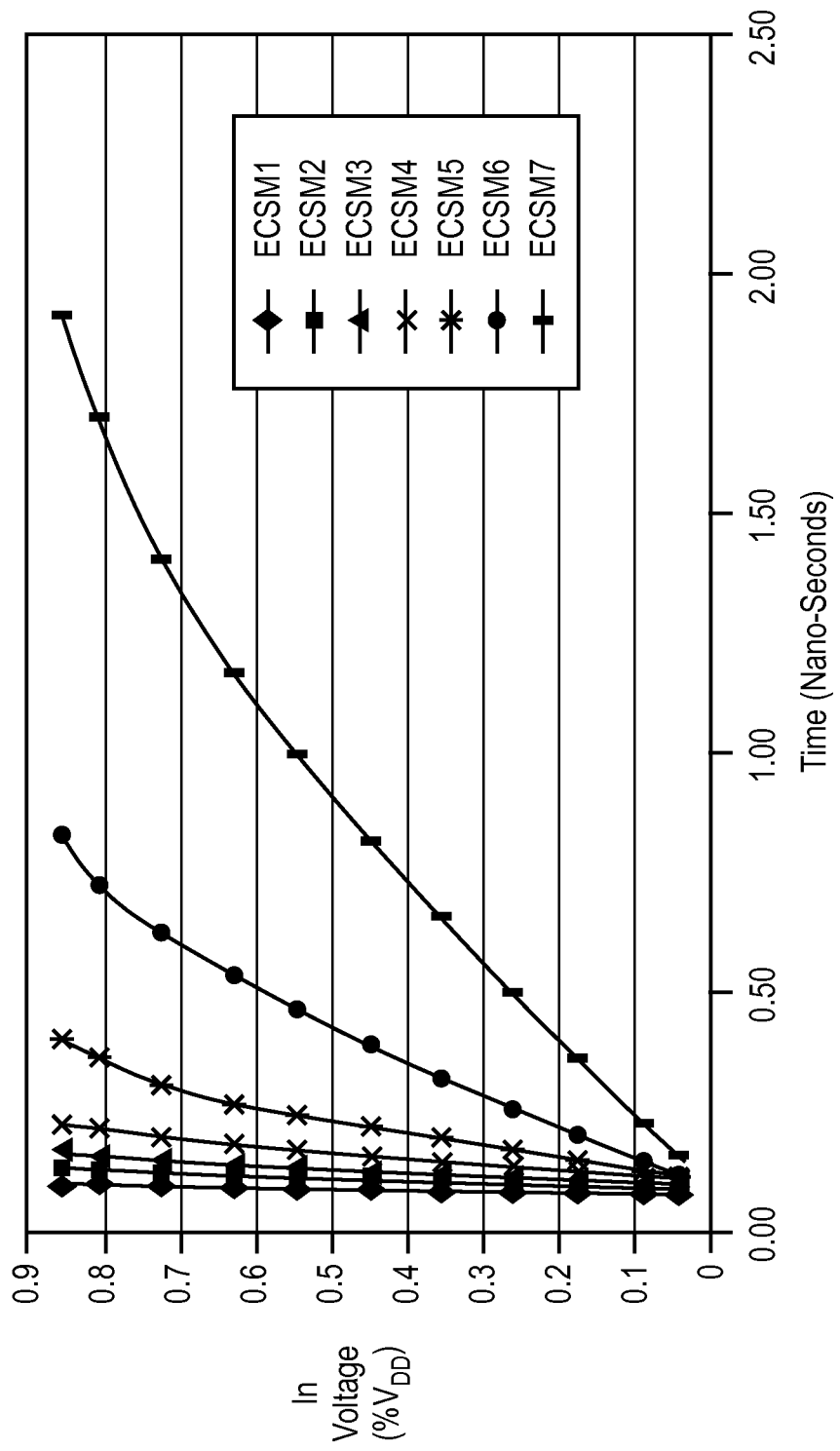

FIGS. 13A-13C show illustrative diagrams representing input signal transition and output current of an example inverter with a capacitive load (FIG. 13A) and an example ECSM table for the inverter (FIG. 13B) and corresponding example waveforms (FIG. 13C). It will be appreciated that these curves are merely for illustrative purposes.

A difference between output characterization waveforms 722 and output voltage waveforms represented output waveforms represented in the ECSM table of FIG. 13B for the selected component can be used to determine the internal capacitance value $C_g$.

More particularly, an expression for the analog current model of FIG. 6 is as follows.

$$(CL+Cg)dvo/dt+C_M(dvo/dt-dvi/dt)=I(vi,vo) \quad (4)$$

The expression (4) alternatively can be represented as, $$(CL+C_g+C_M)dvo/dt=I(vi,vo)+C_M dvi/dt \quad (5)$$

Integrating with expressions (4) and (5) with respect to time between two given times tL, tH gives, $$(CL+C_g+C_M)[vo(tH)-vo(tL)] = \int_{t_L}^{t_H} I(vi,vo)dt + C_M[vi(tH)-vi(tL)] \quad (6)$$

Therefore, the pin cap can be estimated as, $$C_g = 1/[vo(tH)-vo(tL)][\int_{t_L}^{t_H} I(vi,vo)dt] + C_M[vi(tH)-vi(tL)]/[vo(tH)-vo(tL)] - C_M - CL \quad (7)$$

As a piecewise-linear approximation, this produces a value for the output pin cap $C_g$ at the centerpoint output voltage, 0.5[vo(tH)+vo(tL)].

It will be appreciated that $C_g$ is determined typically at the same time as the steps in FIG. 7A but before the steps in FIG. 7B.

Hardware Environment

Figure 14:
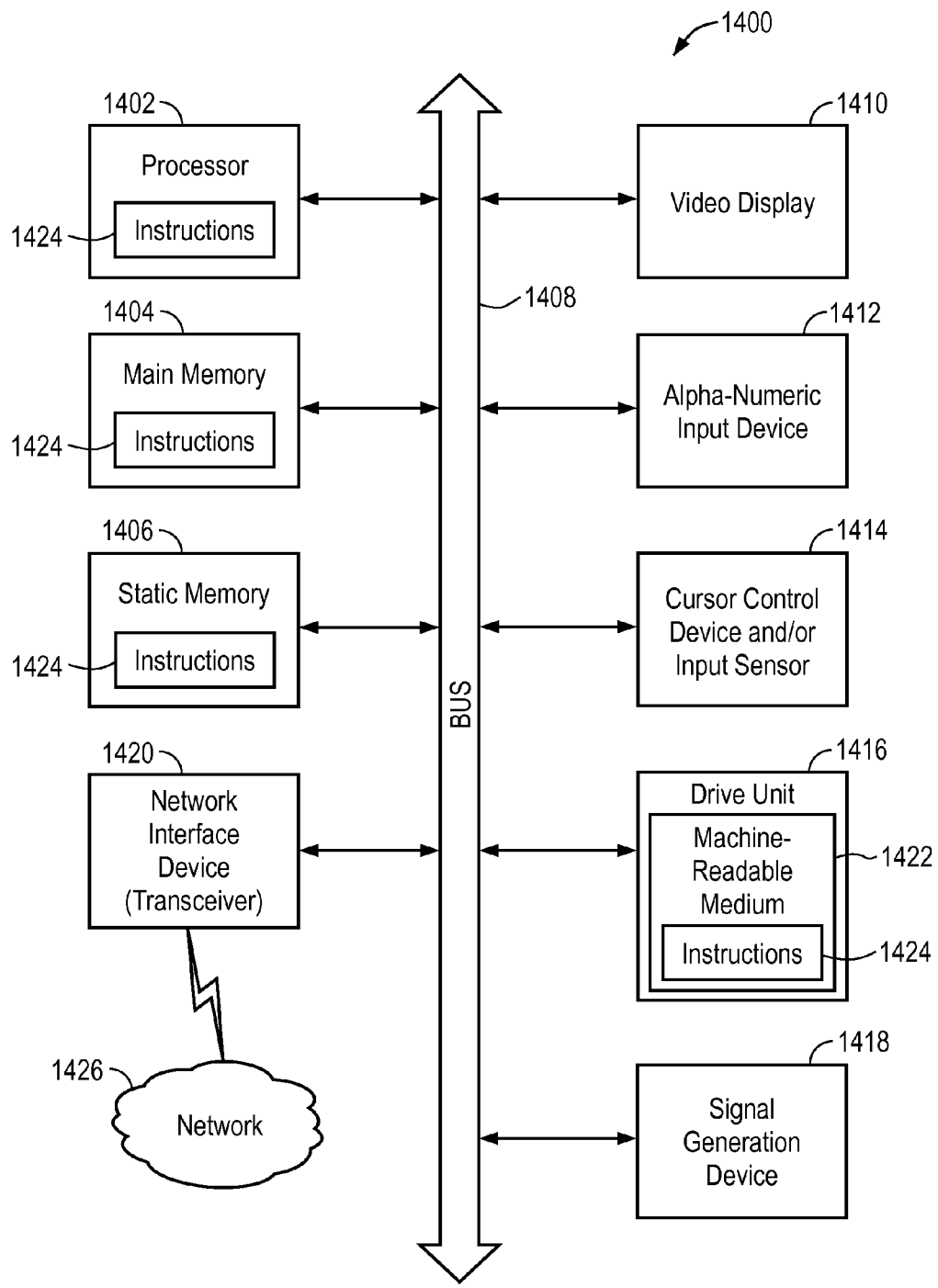
FIG. 14 shows a diagrammatic representation of a machine in the example form of a computer system within which a set of instructions, for causing the machine to perform any one or more of the methodologies discussed herein, may be executed.

FIG. 14 shows a diagrammatic representation of a machine in the example form of a computer system 1400 within which a set of instructions, for causing the machine to perform any one or more of the methodologies discussed herein, may be executed. The computer system 1400 can comprise, for example, can be configured to implement simulation tools including a Static Timing Analysis (STA) tool configured to implement the processes of FIGS. 6, 11 and 12, for example. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404 and a static memory 1406, which communicate with each other via a bus 1408. The computer system 1400 may further include a video display unit 1410 (e.g., liquid crystal display (LCD), organic light emitting diode (OLED) display, touch screen, or a cathode ray tube (CRT)) that can be used to display the waveforms of FIGS. 2A-2B, 7A-7B, 8 9A-9B10A-10B and 13C, for example. The computer system 1400 also includes an alphanumeric input device 1412 (e.g., a keyboard, a physical keyboard, a virtual keyboard using software), a cursor control device or input sensor 1414 (e.g., a mouse, a trackpad, a trackball, a sensor or reader, a machine readable information reader, bar code reader), a disk drive unit 1416, a signal generation device 1418 (e.g., a speaker) and a network interface device or transceiver 1420.

The disk drive unit 1416 includes a non-transitory machine-readable storage device medium 1422 on which is stored one or more sets of instructions (e.g., software 1424) embodying any one or more of the methodologies or functions described herein, such as the processes of FIGS. 6, 11 and 12. The software 1424 may also reside, completely or at least partially, within the main memory 1404 and/or within the processor 1402 during execution thereof by the computer system 1400, the main memory 1404 and the processor 1402 also constituting non-transitory machine-readable storage device media. The non-transitory machine-readable storage device medium 1422 also can store an integrated circuit design and waveform structures.

The 1424 may further be transmitted or received over a network 1426 via the network interface device 920.

While the machine-readable medium 1422 is shown in an example embodiment to be a single medium, the term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, and optical and magnetic media.

It will be appreciated that, for clarity purposes, the above description describes some embodiments with reference to different functional units or processors. However, it will be apparent that any suitable distribution of functionality between different functional units, processors or domains may be used without detracting from the present disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Although the present disclosure has been described in connection with some embodiments, it is not intended to be limited to the specific form set forth herein. One skilled in the art would recognize that various features of the described embodiments may be combined in accordance with the present disclosure. Moreover, it will be appreciated that various modifications and alterations may be made by those skilled in the art without departing from the spirit and scope of the present disclosure.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method for use during static timing analysis of an integrated circuit design to produce an equivalent waveform model encoded in a computer readable storage device to represent a complex waveform provided during the analysis as input signal to a design cell coupled as a delay stage of an integrated circuit design comprising:
configuring a computer to,
use an analog model of an inner component, wherein the analog model is stored in a computer readable storage device, to simulate the inner component to produce multiple analog simulation output characterization waveforms as a function of multiple input waveforms used to characterize the design cell coupled as a delay stage of an integrated circuit design, wherein the analog simulation output characterization waveforms are stored in a computer readable storage device;
use the analog model of the inner component to simulate the inner component to produce an analog simulation output waveform as a function of the complex waveform, wherein the analog simulation output waveform is stored in a computer readable storage device; and
produce the equivalent waveform model as a function of the multiple analog simulation output characterization waveforms and the analog simulation output waveform, wherein the equivalent waveform model is stored in a computer readable storage device.

2. The method of claim 1 further comprising:
configuring the computer to use a static timing analysis tool to produce the complex waveform as the input to the design cell coupled as a delay stage.

3. The method of claim 2, wherein using the static analysis tool to produce the complex waveform includes using the static analysis tool to propagate a prior delay stage output signal through an interconnect network.

4. The method of claim 1, wherein the inner component is coupled to an input node of the design cell that receives the complex waveform as the input signal.

5. The method of claim 1, wherein the inner component is a channel connected component.

6. The method of claim 1, wherein the inner component is a two-transistor inverter.

7. The method of claim 1, wherein the analog model includes a current model that includes a voltage controlled current source in which instantaneous output current drawn through the model is a function of instantaneous input voltage and output voltage.

8. The method of claim 7, wherein the current model includes a two-dimensional table describing a non-linear current source.

9. The method of claim 7, wherein the current model includes a capacitance component.

10. The method of claim 7, wherein the current model includes Miller capacitance component ($C_M$) and pin capacitance component ($C_g$).

11. The method of claim 9 further comprising: determining a value of a capacitance $C_g$ component as a function of the analog simulation output characterization waveforms and output voltage waveforms represented in one of an effective current source models ("ECSM") table or a composite current source models ("CCSM") table for the inner component.

12. The method of claim 1, wherein producing the multiple analog simulation output characterization waveforms as a function of multiple input waveforms used to characterize the design cell includes producing a characterization waveforms slew table; and
wherein producing the output waveform as a function of the complex waveform includes producing an analog simulation output waveform slew table.

13. The method of claim 1, wherein the analog model includes a current model that includes a voltage controlled current source in which drawn output current is a function of instantaneous input voltage and output voltage, and a capacitance component;
wherein producing the multiple analog simulation output characterization waveforms as a function of multiple input waveforms used to characterize the design cell includes producing a characterization waveform slew table that represents output slew as a function of input slew and the capacitive component and a characterization waveforms delay table that represents output slew as a function of input slew and the capacitive component; and
wherein producing the output waveform as a function of the complex waveform includes producing an analog simulation output waveform slew table and an analog output waveform delay table.

14. The method of claim 1, wherein producing the equivalent waveform model as a function of the multiple analog simulation output characterization waveforms and the analog simulation output waveform includes:
interpolating between the multiple analog simulation output characterization waveforms and the analog simulation output waveform to produce an interpolated output waveform; and
inverting the interpolated output waveform to produce the equivalent waveform.

15. The method of claim 14 further comprising:
adjusting an input-side arrival time of the equivalent waveform so an output side arrival time of the equivalent waveform matches an output-side arrival time of the analog simulation output waveform, wherein adjusting includes determining a difference between delay of the equivalent waveform and delay of the analog simulation output waveform.

16. The method of claim 1 further comprising:
determining whether the analog simulation output waveform is monotonic;
and in response to a determination that the analog simulation output waveform is not monotonic, selecting a different inner component; and
configuring the computer to, use an analog model of the different inner component, wherein the analog model is stored in a computer readable storage device, to simulate the different inner component to produce multiple analog simulation output characterization waveforms as a function of multiple input waveforms used to characterize the design cell coupled as a delay stage of an integrated circuit design, wherein the analog simulation output characterization waveforms are stored in a computer readable storage device;
use the analog model of the different inner component to simulate the different inner component to produce an analog simulation output waveform as a function of the complex waveform, wherein the analog simulation output waveform is stored in a computer readable storage device; and
produce the equivalent waveform model as a function of the multiple analog simulation output characterization waveforms and the analog simulation output waveform, wherein the equivalent waveform model is stored in a computer readable storage device.

17. The method of claim 1 further comprising:
determining whether the analog simulation output waveform is monotonic;
and in response to a determination that the analog simulation output waveform is not monotonic, selecting a different inner component; and
configuring the computer to, select between at least an early model and a late model;
use the model to produce a representation of the analog simulation output waveform as a function of the model.

18. The method of claim 1 further comprising:
selecting an inner component of the design cell coupled as a delay stage.

19. An article of manufacture including computer readable storage device
that includes computer readable code to cause a computer to perform a method for use during static timing analysis of an integrated circuit design to produce an equivalent waveform model encoded in a computer readable storage device to represent a complex waveform provided during the analysis as input signal to a design cell coupled as a delay stage of an integrated circuit design, the method comprising:
using an analog model of the inner component, wherein an analog model is stored in
a computer readable storage device, to simulate the inner component to produce multiple analog simulation output characterization waveforms as a function of multiple input waveforms used to characterize the design cell coupled as a delay stage of an integrated circuit design, wherein the analog simulation output characterization waveforms are stored in a computer readable storage device;
using the analog model of the inner component to simulate the inner component to produce an analog simulation output waveform as a function of the complex waveform, wherein the analog simulation output waveform is stored in a computer readable storage device; and producing the equivalent waveform model as a function of the multiple analog simulation output characterization waveforms and the analog simulation output waveform, wherein the equivalent waveform model is stored in a computer readable storage device.

20. The article of claim 19 further comprising:
configuring the computer to use a static timing analysis tool to produce the complex waveform as the input to the design cell coupled as a delay stage;
wherein using the static analysis tool to produce the complex waveform includes using the static analysis tool to propagate a prior delay stage output signal through an interconnect network.

21. The article of claim 19 further comprising:
wherein the analog model includes a current model that includes a voltage controlled current source in which instantaneous output current drawn through the model is a function of instantaneous input voltage and output voltage.

22. The article of claim 21, wherein the current model includes a two-dimensional table describing a non-linear current source.

23. The article of claim 21, wherein the current model includes a capacitance component.

24. The article of claim 21, wherein the current model includes Miller capacitance component ($C_M$) and pin capacitance component ($C_g$).

25. The article of claim 23 further comprising:
determining a value of a capacitance $C_g$ component as a function of the analog simulation output characterization waveforms and output voltage waveforms represented in one of an ECSM table or a CCSM table for the inner component.

26. The article of claim 19, wherein the analog model includes a current model that includes a voltage controlled current source in which drawn output current is a function of instantaneous input voltage and output voltage, and a capacitance component;
wherein producing the multiple analog simulation output characterization waveforms as a function of multiple input waveforms used to characterize the design cell includes producing a characterization waveform slew table that represents output slew as a function of input slew and the capacitive component and a characterization waveforms delay table that represents output slew as a function of input slew and the capacitive component;
and wherein producing the output waveform as a function of the complex waveform includes producing an analog simulation output waveform slew table and an analog output waveform delay table.

27. The article of claim 19, wherein producing the equivalent waveform model as a function of the multiple analog simulation output characterization waveforms and the analog simulation output waveform includes:
interpolating between the multiple analog simulation output characterization waveforms and the analog simulation output waveform to produce an interpolated output waveform; and
inverting the interpolated output waveform to produce the equivalent waveform.

28. The article of claim 27 further comprising:
adjusting an input-side arrival time of the equivalent waveform so an output side arrival time of the equivalent waveform matches an output-side arrival time of the analog simulation output waveform, wherein adjusting includes determining a difference between delay of the equivalent waveform and delay of the analog simulation output waveform.

29. A system comprising:
a storage device that stores information representative of an integrated circuit design; and
a computing device in communication with the storage device, the computing device configured to perform a method during static timing analysis of the integrated circuit design to produce an equivalent waveform model encoded in a computer readable storage device to represent a complex waveform provided during the analysis as input signal to a design cell coupled as a delay stage of an integrated circuit design, the method comprising:
using an analog model of an inner component, wherein the analog model is stored in a computer readable storage device, to simulate the inner component to produce multiple analog simulation output characterization waveforms as a function of multiple input waveforms used to characterize the design cell, wherein the analog simulation output characterization waveforms are stored in a computer readable storage device;
using the analog model of the inner component to simulate the inner component to produce an analog simulation output waveform as a function of the complex waveform, wherein the analog simulation output waveform is stored in a computer readable storage device; and
producing the equivalent waveform model as a function of the multiple analog simulation output characterization waveforms and the analog simulation output waveform, wherein the equivalent waveform model is stored in a computer readable storage device.

* * * * *